Feb. 10, 1931.   G. P. HERRICK   1,792,015
AEROFOIL
Filed Jan. 23, 1930   2 Sheets-Sheet 1

INVENTOR
Gerard P. Herrick,
BY
Bartlett Eyre Scott & Keel
ATTORNEYS

Feb. 10, 1931.  G. P. HERRICK  1,792,015
AEROFOIL
Filed Jan. 23, 1930  2 Sheets-Sheet 2
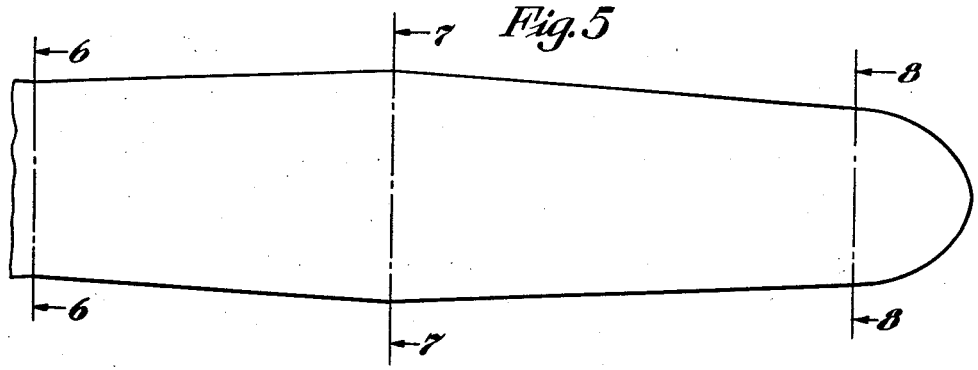
Fig. 5
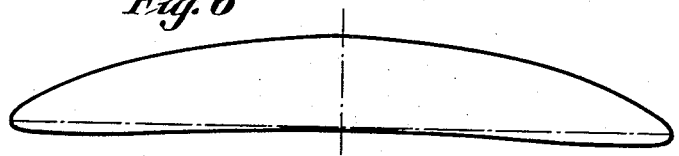
Fig. 6
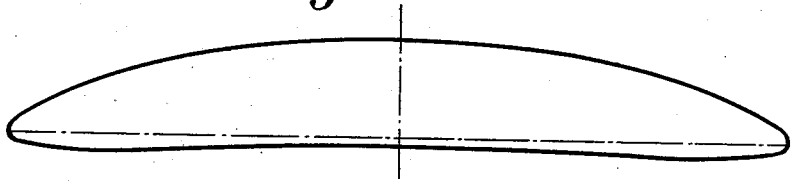
Fig. 7
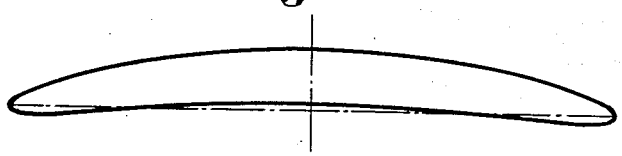
Fig. 8
Fig. 9
INVENTOR
Gerard P. Herrick,
BY
Bartlett Eyre Scott & Keel
ATTORNEYS Patented Feb. 10, 1931

1,792,015

UNITED STATES PATENT OFFICE

GERARD P. HERRICK, OF NEW YORK, N. Y.

AEROFOIL

Application filed January 23, 1930. Serial No. 422,716.

This invention relates to aerofoils.

One object of the invention is an aerofoil having a profile characterized by good aerodynamic efficiency combined with other advantageous features of construction and operation. A further object is an aerofoil profile which is particularly adaptable to mathematical design and calculation thereby obviating the empirical methods of construction of the prior art. A further object is an aerofoil profile having a mathematical derivation and permitting the ready variation of its factors to suit the varying requirements and particularly such a profile which is readily reproduced in its various forms with a minimum of skill required. A further object is an aerofoil profile of form symmetrical about the line perpendicular to the middle of the chord and having, notwithstanding its symmetrical form, a high aerodynamic efficiency, the profile being thereby particularly adapted to use in certain types of aerofoils and planes and as a rotating profile for either lift, traction or windmill purposes, as for example a helicopter lifting propeller, thrust reversing propeller and wind driven propeller for generators and the like, or as a reversible plane or wing in the wind driven rotor landing wing aeroplane set forth in my application executed on even date herewith where the plane is utilized as an ordinary aeroplane wing during normal operation but as a rotating sustaining propeller or windmill landing aeroplane in effecting a steep or emergency landing. A further object is an aerofoil wherein the maximum aerodynamic efficiency and the maximum lift are brought more nearly into coincidence than is possible in prior aerofoils and particularly an aerofoil wherein the angle of attack of maximum aerodynamic efficiency or $$\frac{L}{D}$$

approaches the angle of attack of maximum lift more closely than in the case of the ordinary profile with accompanying advantages. A still further object of the invention is an aerofoil profile permitting the use of rear spars in wing constructions of greater depth than has hitherto been possible with prior constructions while retaining good aerodynamic efficiency. A further object of the invention is an improved method of aerofoil calculation and construction.

For a better understanding of the invention including the above indicated and other features thereof, reference may be had to the accompanying drawings wherein:

Fig. 1 is a plan view of the right half of an aerofoil wing embodying the invention;

Figs. 2 and 3 are profile sections along the lines 2—2 and 3—3 thereof;

Fig. 5 is a plan view of a modified wing embodying the invention;

Figs. 6, 7 and 8 are profile sections along the lines 6—6, 7—7 and 8—8 thereof; and Fig. 9 is a view of a propeller embodying the invention.

Figure 1:
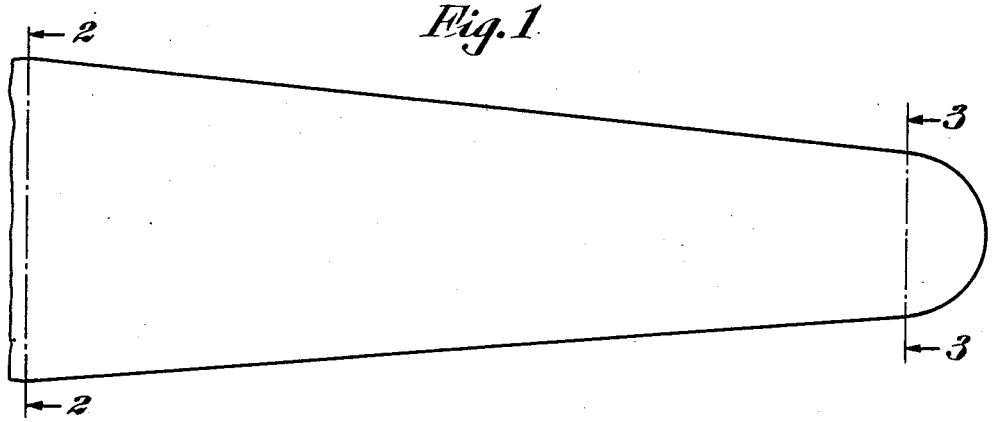
Figure 2:
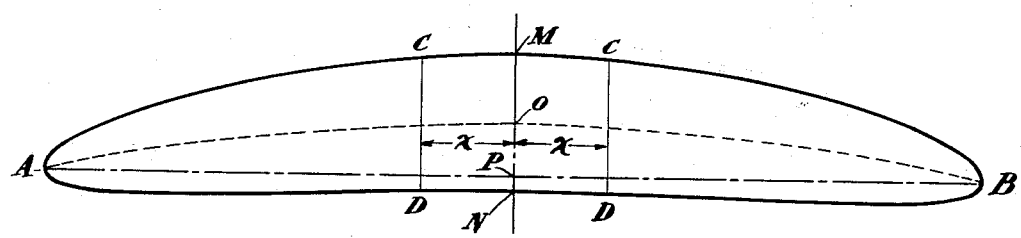

Referring to the drawings I have shown in Fig. 1 the half of an aerofoil wing which tapers from the root section 2—2 to the tip section 3—3 thereof, the chord varying in the proportion of two to one from the root to section 3—3 with a semi-circular tip. While the chord varies, the profile form is constant and accordingly the profile of Fig. 3 at the rounded tip of the wing differs from the profile of Fig. 2 at the root of the wing only in relative size. A description of the profile of Fig. 2 will, therefore, suffice for the description of Fig. 3. The profile of Fig. 2 is symmetrical about the line M—N passing through the center P of the chord and the center of the mean camber line at O, the mean camber line being made up of all points one-half way between the upper and lower cambers of a profile measured along lines perpendicular to the chord of said profile. The depth or thickness of the aerofoil profile at any point, as for example along the line C—D, is equal to $$\frac{a}{c}\sqrt{c^2-4x^2}$$

where $a$ is the maximum thickness of the profile, namely the distance M—N, $c$ is the chord length (APB), and $x$ is the distance along the chord from the center P. The cambers of the profile depend upon mean camber line AOB. The mean camber line AOB is a section or arc of any suitable mathematical curve, the section or arc being symmetrical about the center line MN of the profile. For example, such section or arc representing the mean camber line AOB may be that of a conic section curve which is the preferred curve, though as indicated any mathematical curve may be employed. As examples of such curves I mention the ellipse, the parabola and hyperbola and also the circle which may be regarded as a special case of the ellipse. In the particular example shown the arc or section AOB is that of a circle, though, as indicated above, arcs of other curves symmetrical about the center line MN of the profile may be utilized, the thickness of the profile at any point being determined according to the above formula and the maximum ordinate of the mean camber line AOB having been previously determined. This profile has shown on test a very satisfactory aerodynamic efficiency and it may be used to very good advantage in many types of aeroplanes and particularly in those types where economy in manufacture together with good aerodynamic efficiency and performance is desired. The symmetrical character of the wing itself tends towards economy in manufacture and assembly and the large thickness of the profile near the trailing edge permits the use of a beam or spar of corresponding large depth with consequent increase in the strength for certain uses. The aerofoil is also particularly adapted for use in rotating wing planes as, for example, where one or more wings are mounted for rotation in substantially horizontal planes for increasing the vertical lift with a given relative air velocity of the craft as a whole. The profile is also useful in traction or pusher propellers, the symmetrical and other characteristics of the profile thereof forming an advantageous propeller profile construction together with good aerodynamic characteristics. Moreover, while I have shown in Fig. 2 a symmetrical profile as the preferred construction, certain advantages of the invention are independent of exact symmetry, for example the trailing edge of the profile might be slightly modified to depart from the true symmetrical form while still retaining many advantageous features of construction of the forward part thereof.

Figure 3:
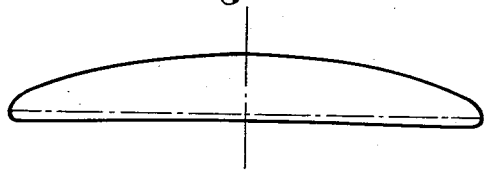

A very satisfactory method of deriving the profile or contour of Figs. 2 and 3 is to distort an ellipse whose original major axis is the chord of the profile and whose minor axis is the maximum thickness of the profile the distortion being in accordance with a section or arc of a mathematical curve which arc is symmetrical with respect to the center line MN of the profile and forms the means camber line of the profile thus obtained.

Figure 4:
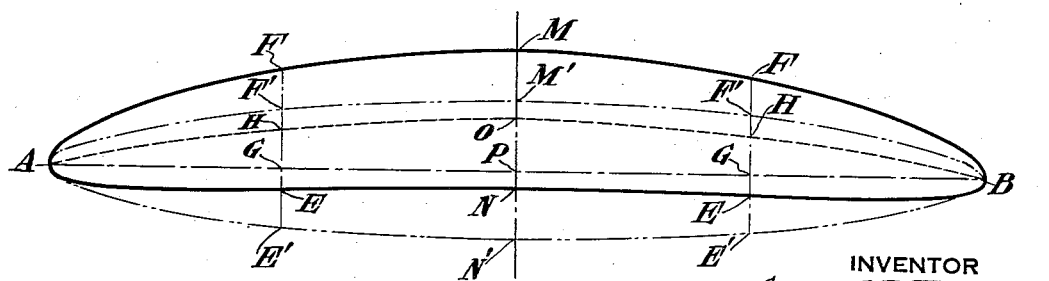
Fig. 4 is an explanatory diagram indicating the method of derivation.

Referring to Fig. 4 I have indicated an ellipse in dot and dash lines AM' BN', APB being the major axis and M'N' being the minor axis, while APB forms the chord of the profile and M'N' is the maximum thickness of the profile. The maximum ordinate of mean camber OP having been given point O is obtained on the minor axis of the ellipse and the arc of the desired curve is drawn through AOB, this arc to be the mean camber of the profile. As indicated above in the particular embodiment shown the arc AOB is the arc of a circle and the profile is obtained by distorting the ellipse in accordance therewith as indicated, the ordinates of the ellipse being moved or displaced perpendicularly to the chord to effect this result, the minor axis M'N' becoming now the maximum thickness MN of the profile and the thickness E'F' of the ellipse now becoming the depth or thickness EF of the profile at any point. The thickness of the profile at any point along the chord is equal to the thickness of the ellipse at that same point. We have, therefore, taking any point, as for example the ordinate GF' of the ellipse, FH=HE=GF'= -GE'. Having been given the maximum thickness $(a)$ of the profile and the chord length $(c)$ the total thickness of the profile at any point along the chord may be determined from the above given formula, and from this total thickness thus obtained the vertical distances from the chord to the upper and lower contours at that point may be determined by adding to and subtracting from one-half of such total thickness a value determined by the arc of the particular curve being used as the mean camber line. For example, this value for an arc of an ellipse is as follows:

$$y=\frac{\left(b^2-\frac{c^2\Delta^2}{4}\right)+\sqrt{\left(\frac{c^2\Delta^2}{4}+b^2\right)^2-4b^2\Delta^2x^2}}{2b}$$

Where $b$ is the maximum ordinate of mean camber, $x$ represents the distance along the chord from the center thereof, $c$ is the chord length, and delta is the ratio of the minor to the major axis. The values GF and GE at any point along the chord may thus be algebraically determined. In the case of a circle the value of delta becomes unity and the above formula is changed accordingly. In the case of the use of a hyperbola instead of an ellipse or circle a corresponding means for obtaining the vertical distances from the chord to the profile contours is from the formula:

$$y = \frac{\left(b^2 + \frac{c^2\Delta^2}{4}\right) - \sqrt{\left(\frac{c^2\Delta^2}{4} - b^2\right)^2 + 4b^2\Delta^2 x^2}}{2b}$$

the value found from that formula to be added to or subtracted from one-half the total depth of the profile at that point. The corresponding formula for a parabola is simpler and is as follows:

$$y = b\left(1 - \frac{4x^2}{c^2}\right)$$

the value found therefrom to be also added to or subtracted from one-half of the total depth or thickness of the profile depending upon whether the point to be selected is on the upper contour or on the lower contour. Where the value thus obtained with any of these formulæ is less than one-half the total thickness of the profile at any point the point on the lower contour is below the chord (Fig. 2) the vertical distance found, whereas if it is larger the point is above the chord the algebraic difference found. The value of delta is to be chosen within practicable and suitable limits and the range of values thereof is unlimited. In the modification of Fig. 1 the profiles are of the same form throughout and in the particular embodiment shown therein the maximum thickness $a$ was chosen as equal to $.14c$, while the maximum ordinate $b$ of mean camber was chosen to be equal to $.056c$.

In Figs. 5, 6, 7 and 8 I show a modified form of wing embodying the invention, the wing being of double trapezoidal shape in plan view, the widest part of the semi wing being indicated at the section 7—7. Figs. 6, 7 and 8 indicate the profile sections at the root intermediate point and tip respectively of the semi wing. In Fig. 6 the profile is determined by $a = .139c$ and $b = .0667c$. The profile of Fig. 7 is determined by $a = .133c$ and $b = .056c$, while in Fig. 8 the profile is determined by $a = .0955c$ and $b = .056c$, $c$ being the chord length in each case. Here as in Figs. 2 and 3 delta was chosen as 1. The profiles 6, 7 and 8 may be either geometrically or algebraically determined similarly to the profile section of Fig. 2 above described. The modification of Fig. 5 has certain aerodynamic advantages for certain purposes. In the profile section of Fig. 8 the lower contour is above the chord at certain points as indicated. This form may be used when especially high lift is desired and lowest drag is not essential and when a very thin section may be used.

In Fig. 9 I have shown a propeller embodying the profile of my invention. It may, for example, be used to 1 advantage as a reversible propeller because the reversal of thrust may be effected without reversal of rotation by changing the blade angles approximately 180°, the resultant efficiency being very markedly greater than can be obtained from the ordinary profile without reversal of rotation of the latter and, moreover, equal thrust may be obtained without reversal of rotation. The angle of attack for maximum $$\frac{L}{D}$$

of this profile seems also to approach the angle of attack for substantially maximum lift more closely than the ordinary profile with the accompanying advantages.

I claim:
1. An aerofoil having a profile whose thickness at any point along the chord is equal to

$$\frac{a}{c}\sqrt{c^2 - 4x^2}$$

where $a$ is the maximum thickness of the profile, $c$ the chord length and $x$ the distance along the chord from the center line to the section, with the arc of a mathematical curve forming the mean camber line of said profile, said arc being symmetrical about the center line of the profile line perpendicular the middle of the chord.

2. An aerofoil of the character set forth in claim 1 wherein the arc is that of a conic section curve.

3. An aerofoil profile having a total thickness at any point along the chord equal to $$\frac{a}{c}\sqrt{c^2 - 4x^2}$$

with the vertical distances from the chord to the upper and lower contours of the profile at any section determined by adding to and subtracting from one-half the total thickness at the point, a value depending upon the character of a mathematical curve which forms the mean camber line of the profile.

4. A symmetrical wing profile having a thickness at any point along the chord equal to $$\frac{a}{c}\sqrt{c^2 - 4x^2}$$

with the vertical distances from the chord to the upper and lower surfaces at any section equal to one-half the total thickness at the point plus or minus $$\frac{\left(b^2 - \frac{c^2\Delta^2}{4}\right) + \sqrt{\left(\frac{c^2\Delta^2}{4} + b^2\right)^2 - 4b^2\Delta^2 x^2}}{2b}$$

respectively, where $c$ represents the chord length, $x$ represents the distance along the chord from the center thereof, $a$ the maximum thickness of the profile, $b$ the maximum ordinate of mean camber and delta the ratio of the axis perpendicular to the chord to the axis parallel to the chord to the ellipse represented by the last named formula.

5. A symmetrical wing profile having a thickness at any point equal to $$\frac{a}{c}\sqrt{c^2-4x^2}$$

with the vertical distances from the chord to the upper and lower surfaces at any point equal to one-half the total thickness plus or minus $$y = \frac{\left(b^2+\frac{c^2\Delta^2}{4}\right)-\sqrt{\left(\frac{c^2\Delta^2}{4}-b^2\right)^2+4b^2\Delta^2 x^2}}{2b}$$

respectively, where $c$ represents the chord length, $x$ represents the distance along the chord from the center thereof, $a$ the maximum thickness of the profile, $b$ the maximum ordinate of mean camber and delta the ratio of the axis perpendicular to the chord to the major axis of the hyperbola represented by the last named formula.

6. A symmetrical wing profile having a thickness at any point equal to $$\frac{a}{c}\sqrt{c^2-4x^2}$$

with the vertical distances from the chord to the upper and lower surfaces at any point equal to one-half the total thickness plus or minus $$y = b\left(1-\frac{4x^2}{c^2}\right)$$

respectively, where $c$ represents the chord length, $x$ represents the dstance along the chord from the center thereof, $a$ the maxmum thickness of the profile, $b$ the maximum ordinate of mean camber.

7. An aerofoil whose profile is an ellipse substantially symmetrically deformed with respect to the minor axis but unsymmetrically with respect to the major axis with the major axis of the ellipse equal to the chord of the profile and the maximum thickness of the profile equal to the minor axis of the ellipse.

8. An aerofoil whose profile is a deformed ellipse with the major axis of the ellipse equal to the chord of the profile and the maximum thickness of the profile equal to the minor axis of the ellipse, said ellipse having been deformed in accordance with a section of a mathematical curve, said section being symmetrical as to the center line of the profile and being the mean camber line of said profile.

9. An aerofoil of the character set forth in claim 8 wherein the mathematical curve is a conic section.

10. An aerofoil surface for producing sustentation, thrust, torque and the like having a profile which is a deformed ellipse with the major axis of the ellipse equal to the desired chord of the profile and the minor axis the desired maximum thickness, said ellipse having been deformed in accordance with the maximum mean camber and an arc of a symmetrical curve.

11. An aerofoil having a profile which is a deformed ellipse with the major axis thereof equal to the chord of the profile and the minor axis the maximum thickness of the profile, said ellipse having been deformed so as to have a mean camber line which is the arc of a symmetrical curve, said thickness and camber being within ordinary reasonable limits of aerofoil practice.

12. An aerofoil having a profile whose fore part has a thickness at any point equal to $$\frac{a}{c}\sqrt{c^2-4x^2}$$

where $a$ is the maximum thickness of the profile, $c$ the chord length and $x$ the distance along the chord from the center, with the arc of a mathematical curve forming the mean camber of said profile, said arc being symmetrical about the center line of the profile perpendicular to the chord.

13. A propeller having an aerofoil profile of the character set forth in claim 12.

14. A propeller having an aerofoil profile of the character set forth in claim 1.

15. An aerofoil surface for producing sustentation, thrust, torque and the like having a profile which is an ellipse substantially symmetrically deformed with respect to its minor axis but unsymmetrically with respect to the major axis with the major axis of the ellipse forming the cord of the profile and the maximum thickness of the profile being substantially equal to the minor axis of the ellipse.

16. An aerofoil whose profile is an ellipse deformed substantially symmetrically with respect to the minor axis and transversely of and unsymmetrically with respect to the major axis, with the thickness of the profile at any point along the chord being substantially the thickness of the ellipse at the equivalent point along the major axis of the ellipse.

17. An aerofoil whose profile is an ellipse deformed substantially symmetrically with respect to the minor axis and transversely of and unsymmetrically with respect to the major axis, the mean camber line of the profile being a symmetrical arc of a curve and the thickness and camber thereof being within ordinary reasonable limits of aerofoil practice.

18. An aerofoil whose profile is an ellipse deformed substantially symmetrically with respect to the minor axis and transversely of and unsymmetrically with respect to the major axis, said ellipse having been deformed in accordance with a section of a mathematical curve, said section being symmetrical as to the center line of the profile and being the mean camber line of said profile.

In testimony whereof, I have signed my name to this specification.

GERARD P. HERRICK.